Jan. 25, 1927.
R. D. EVANS
1,615,688
METERING SYSTEM
Filed Dec. 7, 1921
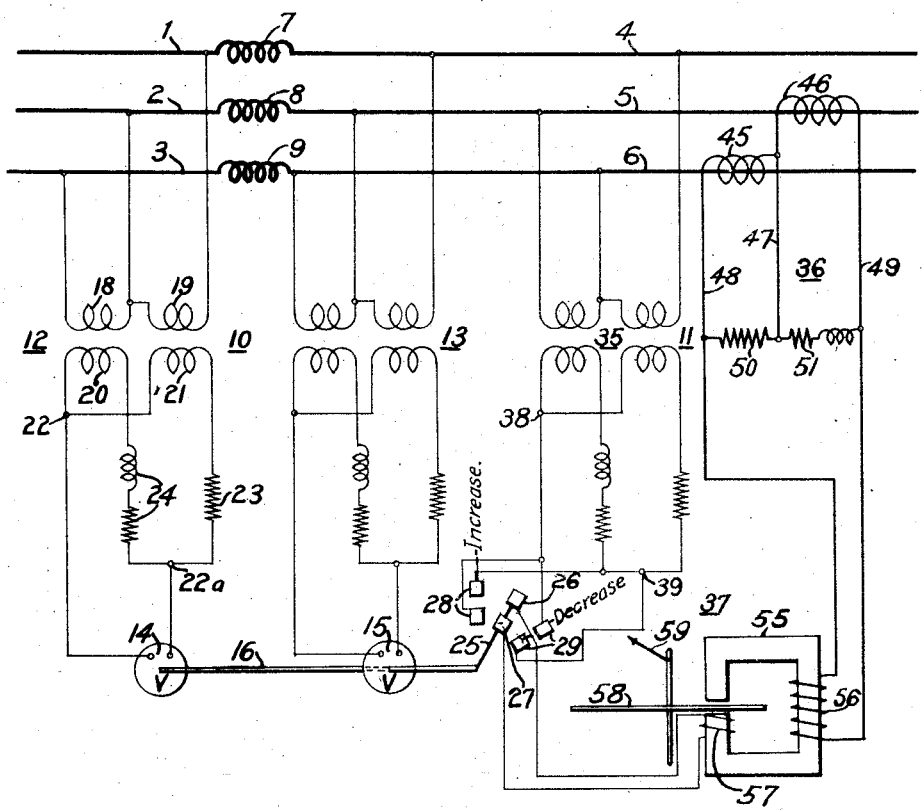
WITNESSES:
INVENTOR
Robert D. Evans.
BY
ATTORNEY Patented Jan. 25, 1927.

1,615,688

UNITED STATES PATENT OFFICE.

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA.

METERING SYSTEM.

Application filed December 7, 1921. Serial No. 520,615.

My invention relates to electrical measuring instruments and systems and it has special relation to the measurement of the unbalanced load in an electrical circuit.

In practicing my invention, I utilize the broad principles of indicating the symmetrical components of the unbalanced quantities of an electrical system disclosed and claimed in the patent issued upon the copending application of Charles LeG. Fortescue, Lewis W. Chubb and Joseph Slepian, No. 1,535,593, dated April 28, 1925, and also in the patent issued upon my copending application, No. 1,535,587, dated April 28, 1925, both of which are assigned to the Westinghouse Electric & Manufacturing Company.

In the first-mentioned patent to Fortescue et al., the general principles of the measurement of the symmetrical components of the unbalanced currents or voltages of an unbalanced polyphase circuit are described and broadly claimed. In the second patent, the specific component-segregating means utilized in this application is disclosed and claimed.

It has been discovered and disclosed in the above-mentioned applications that any unbalanced polyphase system of electrical quantities may be resolved into two or more symmetrical systems. These quantities, for example, whether currents, voltages or energy, may be resolved into a positive phase-sequence component, a negative phase-sequence component, and a zero phase-sequence component. In a three-phase three-wire system, the zero phase-sequence component is of zero value and only the positive and the negative phase-sequence components need be considered.

One object of my present invention is to provide a measuring device embodying means for indicating whether the unbalanced condition of currents, voltages or energy in a polyphase load circuit corresponds to increasing or decreasing the degree of unbalance of the system, together with means responsive to such indication for measuring the amount of unbalance of the load.

Other objects of my invention will become evident from the following detailed description taken in conjunction with the accompanying drawing, the single figure of which is a diagrammatic view of a measuring device and system organized in accordance with my present invention.

Referring to the drawing, the system here shown comprises a plurality of conductors 1, 2 and 3 constituting the supply-circuit side of an electrical system and a plurality of corresponding conductors 4, 5 and 6 constituting the load-circuit side of the system, a plurality of equal impedance devices, such as reactors or transformers, 7, 8 and 9 being inserted in the respective conductors 1, 2 and 3 and separating the circuit into a supply-circuit side and a load-circuit side, as indicated by the corresponding legends.

A device 10 similar to the device shown and claimed in co-pending application, Serial No. 370,229, filed March 31, 1920, by C. T. Allcutt, and assigned to the Westinghouse Electric & Manufacturing Company is provided for indicating whether the unbalance of the load circuit tends to oppose or assist the unbalance of the system taken as a whole, while a second device 11 is adapted to indicate the amount of unbalance of the load and is dependent upon the action of the device 10, as subsequently described in detail.

The unbalance-direction-indicator 10 comprises a pair of negative-phase-sequence voltage-component devices 12 and 13 which are associated with the supply and the load circuits, respectively, to provide an indication in accordance with the negative-phase-sequence component of the voltages thereof. The terminals of the respective devices 12 and 13 are connected to suitable contact-making voltmeters, or the like, 14 and 15, which are mechanically connected, as by means of a common shaft or spindle 16.

The negative-phase-sequence device 12 comprises two primary transformer coils or windings 18 and 19, which are respectively connected across the pairs of conductors 2 and 3 and 2 and 1 of the supply-circuit side. Secondary transformer windings or coils 20 and 21 are provided having one common terminal 22. A resistor 23 is connected to the outer terminal of the transformer winding 21 while a combined resistor and reactor 24 of equal absolute value is connected to the inner terminal of the transformer winding 20. The characteristics of the impedances 23 and 24 are such that the currents traversing the same are 180° out of phase, under balanced circuit conditions. The circuits comprising the resistor and reactor devices 23 and 24 are provided with a common terminal 22ª which, together with the previously-mentioned terminal 22, are connected directly to the terminals of the contact-making voltmeter 14. With the connections shown, the voltmeter 14 is traversed by a current proportional to the negative phase-sequence component of voltage which is zero, under balanced conditions.

The device 13 is of identical construction with the device 12 and is connected to the terminals of the contact-making voltmeter 15.

The contact-making voltmeters 14 and 15 are mechanically opposed, that is, they tend to act oppositely upon the common shaft or spindle 16. Consequently, the shaft 16 will assume a position in accordance with whether the negative phase-sequence voltage of the supply side or of the load side of the circuit is the greater at a given instant; that is, whether the load tends to balance or unbalance the system. The balanced impedance 7, 8, 9 constitutes a balancing device which tends to balance the voltages of the circuit.

One end of the shaft or spindle 16 is provided with a contact-making arm 25, which is suitably provided with a pair of alined contact members 26 and 27. These contact members are adapted to engage either a pair of stationary contact members 28, in one extreme position marked "Increase", or a pair of stationary contact members 29, in the other extreme position marked "Decrease." These legends indicate that the movement of the contact-making arm 25 in the one or the other directions serves to indicate that the unbalanced condition of the load circuit is of such character as to either increase or decrease the degree of unbalance of the electrical system taken as a whole. Such movement of the contact-making arm 25 is employed for a purpose to be hereinafter set forth in detail.

The unbalance-measuring device 11 comprises a positive-phase-sequence device 35 and a negative phase-sequence device 36 that are adapted to provide electromotive forces that are proportional to the positive-phase-sequence component of the voltage of the load circuit and to the negative-phase-sequence component of the current thereof, respectively.

A wattmeter or watthour meter or instrument 37 is adapted to have its respective co-operating elements or coils energized from the devices 35 and 36, respectively, as subsequently more fully set forth.

The positive-phase-sequence device 35 is of the same character as the previously-described devices 12 and 13, but it will be noted that two of the terminals of the primary transformer winding are interchanged with respect to the terminals of the previously-described transformer coils 18 and 19, as regards their connection to the conductors 2 and 3 of the supply side. This reversal of connections serves to render the device 35 capable of measuring the positive phase-sequence component of the voltage of the load side of the circuit, as fully set forth in my above-identified copending application.

The terminals 38 and 39 of the device 35 are connected in one sense to the stationary contact terminals 28 and in the reverse sense to the stationary contact terminals 29; that is to say, the upper stationary contact terminal 28 is connected to the terminal 39, while the lower contact terminal 28 is connected to the terminal 38. The opposite is true with respect to the contact members 29. The purpose of this reversing connection will be set forth below.

The negative-phase-sequence device 36 comprises a plurality of series or current transformers, the secondary windings 45 and 46 of which are respectively associated with the conductors 5 and 6 of the load side. A common intermediate conductor 47 for the transformer windings 45 and 46 is provided, while conductors 48 and 49 are respectively connected to the outer terminals of the transformers 45 and 46.

A resistor 50 is connected between the conductors 48 and 47; that is, in parallel relation to the transformer winding 45, while a combined resistor and reactor 51 is connected between the conductors 47 and 49; that is, in parallel relation to the series transformer winding 46. The impedances 50 and 51 are equal and of such characteristics that the voltages across the same are 180° out of phase, under balanced conditions in the circuit. As a result of this system of connections, the device 36 is adapted to produce at its terminals an electromotive force that is proportional to the negative-phase-sequence component of the current traversing the load circuit, as fully explained in the above-identified patents.

The wattmeter or watthour meter 37 comprises a magnetizable core member 55, upon one leg of which a current coil 56 is wound and is connected to the terminals of the negative-phase-sequence device 36. A second or voltage coil 57 is directly connected through suitable flexible leads to the movable contact members 26 and 27 of the apparatus 10.

The usual rotatable element or disk armature member 58 is provided in the measuring device 37, together with the familiar pointer 59, or other indicating device, which is shown in a conventional manner.

It will be seen that the current coil 56 of the wattmeter device 37 is thus energized in accordance with the negative-phase-sequence component of the current traversing the load circuit, while the voltage coil 57 is adapted to be energized in accordance with the positive-phase-sequence component of the voltage of the load circuit in the one direction or the other, dependent upon the position of the contact-making arm 25.

The operation of my invention may be briefly set forth as follows: In the case of an unbalanced current traversing the load-circuit conductors 4, 5 and 6, the contact-making arm 25 will assume the position marked "Increase", or the opposite position marked "Decrease", dependent upon whether the negative-phase-sequence component of the voltage in the load circuit is greater than that in the supply circuit or vice versa. In either event, the voltage coil 57 of the wattmeter device 37 becomes energized, but the direction of such energization is, of course, dependent upon the position of the contact-making arm 25. Therefore, the indication given by the pointer 59 of the wattmeter device 37, as a result of the interaction of the voltage coil 57 and the constantly-energized current coil 56, will be a measure of the amount of unbalance of the load, and the direction taken by the pointer 59 from a central or neutral position will, at the same time, indicate whether such unbalanced load tends to assist or oppose the unbalance of the system taken as a whole.

Consequently, by the combination of the two devices 10 and 11, the direction of unbalance in the customer's or load circuit is indicated by the apparatus 10, whereas the amount of such unbalance is indicated by the device 11. In this way, it may be determined whether the customer should pay a penalty for increasing the degree of unbalance of the supply circuit or should receive a bonus for decreasing the unbalance thereof.

It will be seen that I have thus provided a measuring device and system whereby a single ultimate indication serves to simultaneously measure the amount of unbalance in a load or customer's circuit and indicate the direction of such unbalance, that is, whether it tends to assist or oppose the unbalance of the system taken as a whole.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In an electrical system, the combination with a polyphase circuit connected to said system and carrying an unbalanced load, of means for indicating whether such unbalance tends to increase or decrease the degree of unbalance of the system, and a measuring instrument responsive to such indication.

2. In an electrical system, the combination with a polyphase circuit connected to said system and traversed by an unbalanced load, of means for indicating whether such unbalance tends to correct or aggravate the degree of unbalance of the system, and means rendered effective by the first-mentioned means to measure the amount of unbalance of the load.

3. In an electrical system, a measuring device for a polyphase circuit connected to said system and carrying an unsymmetrical load, said device comprising means for indicating whether such unsymmetry tends to increase or decrease the unsymmetry of the system, a plurality of elements respectively energized in accordance with the positive-phase-sequence and the negative-phase-sequence components of unsymmetrical electrical quantities and adapted to indicate the product of said components, and means for rendering the latter indication dependent upon the former indication.

4. In an electrical system, a measuring device for an electrically unbalanced polyphase circuit connected to said system comprising a relay device for indicating whether the unbalance of said circuit tends to correct or aggravate the unbalance of the system, a plural-element electro-responsive device, means for energizing one of said elements in accordance with the counter-rotational component of the current of the circuit, and means including said relay device for energizing another of said elements in accordance with the direct-rotational component of a quantity of said circuit.

5. In an unbalanced electrical system, a measuring device for an electrically unbalanced polyphase circuit connected to said system comprising means for indicating whether the unbalance of said circuit tends to increase or decrease the unbalance of the system, a plurality of cooperating elements, means for impressing upon said elements different components of the set of symmetrical components into which the unbalanced quantities may be resolved, the last-named means being dependent upon the action of the first-named means and both of said means comprising transformers and resistors and reactors connected to said circuit.

6. In an unbalanced electrical system, a measuring device for an electrically unbalanced polyphase circuit connected to said system comprising means for indicating whether the unbalance of said circuit tends to correct or aggravate the unbalance of the system, and a plurality of elements respectively energized in accordance with symmetrical components of different electrical quantities of said circuit, the energization of one of said elements being dependent upon the operation of said means.

7. In an electrical system, a measuring device for an electrically unbalanced polyphase circuit connected to said system comprising means embodying a relay device for indicating whether the unbalance of said circuit tends to correct or aggravate the unbalance of said system, and an electroresponsive device comprising a plurality of coils respectively energized in accordance with symmetrical components of the voltage and the current of said circuit, the energization of one of said coils being responsive to the operation of said relay device.

8. In an unbalanced electrical system, a measuring device for an electrically unbalanced polyphase circuit connected to said system comprising means embodying a relay device for indicating whether the unbalance of said circuit tends to increase or decrease the degree of unbalance of the system, and a plurality of elements respectively energized in accordance with the positive-phase-sequence component of the voltage and the negative-phase-sequence component of the current of said circuit, the energization of one of said elements being responsive to the operation of said relay device.

9. In an electrical system, the combination with a polyphase circuit connected to said system and carrying an unbalanced load, of means for indicating whether such unbalance tends to increase or decrease the degree of unbalance of the system, and means responsive to such indication for measuring the amount of unbalance of the load, the first-named means comprising a plurality of oppositely-connected electroresponsive devices.

10. In an electrical system, the combination with a polyphase circuit connected to said system and traversed by an unbalanced load, of means comprising a relay device for indicating whether such unbalance tends to correct or aggravate the degree of unbalance of the system, and means rendered effective by the operation of said relay device to measure the amount of unbalance of the load, said relay device comprising a plurality of oppositely-acting negative phase-sequence devices.

11. In an electrical system, a measuring device for a polyphase circuit connected to said system and carrying an unsymmetrical load, said device comprising means for indicating whether such unsymmetry tends to increase or decrease the unsymmetry of the system, a plurality of elements respectively energized in accordance with the positive-phase-sequence and the negative-phase-sequence components of unsymmetrical electrical quantities and adapted to indicate the product of two of said components, and means for rendering the latter indication dependent upon the former indication, the first-named means comprising a plurality of electro-responsive devices respectively energized in accordance with certain phase-sequence components of electrical quantities of said system and of said circuit.

12. In an electrical system, a measuring device for an electrically unbalanced polyphase circuit connected to said system comprising a relay device for indicating whether the unbalance of said circuit tends to correct or aggravate the unbalance of the system, a plural-element electro-responsive device, means for energizing one of said elements in accordance with the counter-rotational component of the current of the circuit, and means including said relay device for energizing another of said elements in accordance with the direct-rotational component of the voltages of said circuit, said relay device comprising a plurality of oppositely-acting electro-responsive devices respectively energized in accordance with the counter-rotational components of the voltages of said system and said circuit.

13. In an unbalanced electrical system, a measuring device for an electrically unbalanced polyphase circuit connected to said system comprising means for indicating whether the unbalance of said circuit tends to increase or decrease the unbalance of the system, a plurality of co-operating elements, means for impressing upon said elements different components of the set of symmetrical components into which the unbalanced quantities may be resolved, the last-named means being dependent upon the action of the first-named means and both of said means comprising transformers and resistors and reactors connected to said circuit, the first-named means further comprising a pair of mechanically opposed contact-making electroresponsive devices respectively energized in accordance with the negative-phase-sequence components of certain electrical quantities of said system and said circuit.

14. In an unbalanced electrical system, a measuring device for an electrically unbalanced polyphase circuit connected to said system comprising means for indicating whether the unbalance of said circuit tends to correct or aggravate the unbalance of the system, and a plurality of elements respectively energized in accordance with certain symmetrical components of the electrical quantities of said circuit, the energization of one of said elements being dependent upon such indication by said means, said means comprising a plurality of oppositely-acting voltage-responsive devices respectively energized in accordance with the negative phase-sequence components of certain electrical quantities of said system and said circuit.

15. In an electrical system, a measuring device for an electrically unbalanced polyphase circuit connected to said system comprising means embodying a relay device for indicating whether the unbalance of said circuit tends to correct or aggravate the unbalance of said system, and a plurality of coils respectively energized in accordance with different symmetrical components of the voltage and the current of said circuit, the energization of one of said coils being responsive to such indication by said relay device, said relay device comprising a plurality of oppositely-acting voltage-responsive devices respectively energized in accordance with the negative phase-sequence components of certain electrical quantities of said system and said circuit.

16. In an unbalanced electrical system, a measuring device for an electrically unbalanced polyphase circuit connected to said system comprising means embodying a relay device for indicating whether the unbalance of said circuit tends to increase or decrease the degree of unbalance of the system, and a plurality of elements respectively energized in accordance with different symmetrical components of the electrical quantities of said circuit, the energization of one of said elements being responsive to such indication by said relay device, said relay device comprising a pair of mechanically opposed contact-making voltmeters respectively energized in accordance with the negative-phase-sequence components of the voltages of said system and said circuit.

17. In an electrical system, the combination with a polyphase circuit connected to said system and carrying an unbalanced load, of means adapted to measure the amount of such unbalance, said means having a normally inoperative element, and means responsive to the relative unbalance of the load and supply circuits for rendering said element operative, whereby the first-named means gives a single indication of the amount and origin of such unbalance.

18. In an unbalanced electrical system, a measuring device for an electrically unbalanced circuit connected to said system comprising means for indicating whether the unbalance of said circuit tends to increase or decrease the unbalance of the system, said indicating means having a movable contact making arm, a plurality of co-operating elements, means for energizing one of said elements in accordance with one symmetrical component of an electrical quantity of said circuit, and means responsive to the movement of said arm for energizing another of said elements in accordance with a symmetrical component of another electrical quantity of said circuit.

19. In an electrical system, a measuring device for an electrically unbalanced polyphase circuit connected to said system comprising means embodying a relay device for indicating the relative unbalance of said circuit and the system, said relay device having a contact-making arm, an electroresponsive device comprising a plurality of coils, one of which is energized in accordance with a symmetrical component of the current of said circuit, and means responsive to the movement of said arm for impressing upon another of said coils in the one or the other direction a voltage proportional to a symmetrical component of the voltage of said circuit.

20. In an electrical system, a measuring device for an electrically unbalanced polyphase circuit connected to said system comprising means embodying a relay device for indicating whether the unbalance of said circuit tends to increase or decrease the degree of unbalance of the system, said relay device comprising a pair of mechanically opposed contact-making voltmeters respectively energized in accordance with the negative-phase-sequence components of the voltages of said system and said circuit and further comprising a contact-making arm, an electroresponsive device comprising a plurality of coils one of which is energized in accordance with the negative-phase-sequence component of the currents of said circuit, and means responsive to the movement of said arm for impressing upon another of said coils in the one or the other direction a voltage proportional to the positive-phase-sequence component of the voltages of said circuit.

21. In an electrical system comprising a load circuit and a measuring instrument connected thereto, the combination of means for measuring the relative unbalance of the load circuit and said system and means controlled thereby for modifying the operation of said instrument.

22. In an electrical system comprising a load circuit and a measuring instrument connected thereto, the combination of a device connected to said circuit, means for operating said device when the unbalance of said circuit is such as to aggravate the unbalanced condition of the system and means controlled thereby for causing said instrument to be energized in a predetermined manner under these conditions.

23. In an electrical system comprising a load circuit, a circuit-closing device connected to the circuit and means for actuating said device when said load circuit is so unbalanced as to increase the unbalance of said system.

In testimony whereof, I have hereunto subscribed my name this 23rd day of November, 1921.

ROBERT D. EVANS.